(12) United States Patent
Buey et al.

(10) Patent No.: US 6,968,694 B2
(45) Date of Patent: Nov. 29, 2005

(54) AUGMENTOR

(75) Inventors: John R. Buey, Vernon, CT (US); John M. Bonnell, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 196 days.

(21) Appl. No.: 10/388,249

(22) Filed: Mar. 13, 2003

(65) Prior Publication Data

US 2004/0177616 A1 Sep. 16, 2004

(51) Int. Cl.$^7$ ............................................... F02K 3/10
(52) U.S. Cl. ............................ 60/761; 60/765; 60/749
(58) Field of Search .................... 60/761–765, 749, 60/750, 39.5

(56) References Cited

U.S. PATENT DOCUMENTS

| | | | | | |
|---|---|---|---|---|---|
| 2,637,972 A | * | 5/1953 | Laucher | ....................... | 60/765 |
| 2,693,083 A | * | 11/1954 | Abbott | ....................... | 60/749 |
| 2,828,603 A | * | 4/1958 | Lauche | ....................... | 60/761 |
| 2,866,313 A | * | 12/1958 | Holl | ....................... | 60/765 |
| 2,979,899 A | * | 4/1961 | Salmon et al. | ................ | 60/749 |
| 3,455,108 A | * | 7/1969 | Clare et al. | ................... | 60/749 |
| 3,605,407 A | * | 9/1971 | Bryce | ....................... | 60/749 |
| 3,800,530 A | * | 4/1974 | Nash | ....................... | 60/761 |
| 3,913,319 A | * | 10/1975 | Hall | ....................... | 60/749 |
| 4,821,512 A | * | 4/1989 | Guile et al. | ................... | 60/768 |

* cited by examiner

Primary Examiner—Ted Kim
(74) Attorney, Agent, or Firm—Bachman & LaPointe, P.C.

(57) ABSTRACT

A turbine engine has a centerbody within a gas flowpath and a downstream tailcone and a pilot at an upstream end of the tailcone. A flameholder is positioned in the flowpath outboard of the centerbody. The pilot has a first surface diverging in a downstream direction.

20 Claims, 2 Drawing Sheets

AUGMENTOR

U.S. GOVERNMENT RIGHTS

The invention was made with U.S. Government support under contract F33657-91-C-0007 awarded by the U.S. Air Force. The U.S. Government has certain rights in the invention.

BACKGROUND OF THE INVENTION (1) Field of the Invention

This invention relates to turbine engines, and more particularly to turbine engine augmentors.

(2) Description of the Related Art

Afterburners or thrust augmentors are known in the industry. A number of configurations exist. In a typical configuration, exhaust gases from the turbine pass over an augmentor centerbody. Additional fuel is introduced proximate the centerbody and is combusted to provide additional thrust. In some configurations, the augmentor centerbody is integrated with the turbine centerbody. In other configurations, the augmentor centerbody is separated from the turbine centerbody with a duct surrounding a space between the two. Such remote augmentor configurations are useful in military applications in which it is desired to place the engine well forward of the exhaust nozzle. Because of requirements to conserve fuel and control part wear, engine augmentation is only used when required by the mission. For that reason, effective and reliable lighting of the augmentor is critical in military applications and is balanced against other performance considerations.

BRIEF SUMMARY OF THE INVENTION

Accordingly, one aspect of the invention involves a turbine engine. A centerbody is located within a gas flowpath and has a downstream tailcone and a pilot proximate an upstream end of the tailcone. A flameholder is positioned in the flowpath outboard of the centerbody. The pilot has a first surface diverging in a downstream direction. In various implementations, the first surface may be frustoconical. The pilot may comprise a channel having upstream and downstream rims. A base of the channel may have a depth from a closer of said upstream and downstream rims of between 25 mm and 75 mm. The channel may serve to redirect a pilot flow so as to create enhanced mixing effective to maintain flame propagation radially outward along the flameholder. The centerbody may have a number of air conduits delivering air jets radially outward proximate the downstream rim. Fuel injectors may be positioned at inboard ends of associated spray bars extending through elements of the flameholder. Igniters may be positioned within the elements to ignite fuel from associated ones of the fuel injectors.

In another aspect, the invention is directed to a turbine engine centerbody extending from upstream to downstream along a central axis. From upstream to downstream the centerbody has a nose, a radially diverging fore surface, an apex region, a pilot, and a radially converging tailcone. The pilot has a radially converging upstream surface, a base surface, and a radially diverging downstream surface. In various implementations, there may be air conduits proximate the downstream surface of the pilot delivering air jets radially outward from the centerbody for enhancing flow recirculation within the pilot.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
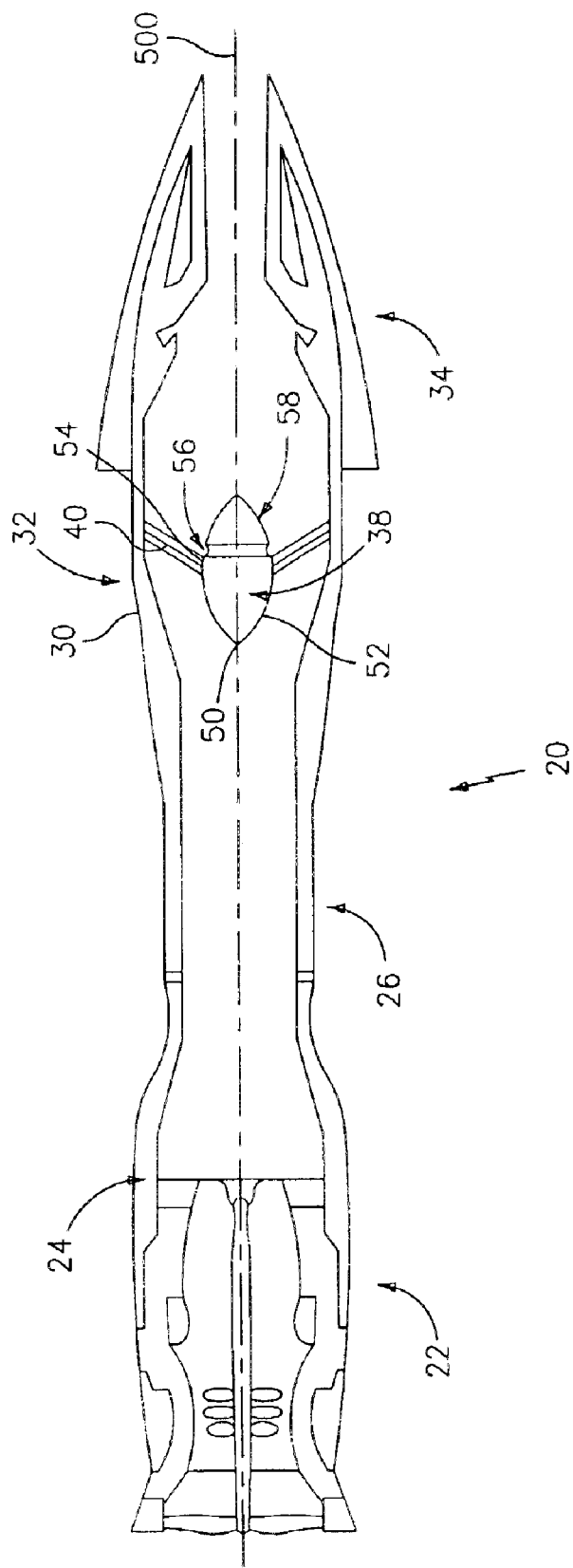
FIG. 1 is a schematic longitudinal sectional view of an aircraft powerplant.

FIG. 1 shows a powerplant 20 having a central longitudinal axis 500. From upstream to downstream, the powerplant includes a turbine engine 22 having a downstream turbine exhaust case (TEC) 24. A duct extension 26 extends from the TEC 24 to join with a housing 30 of an augmentor 32. A thrust vectoring nozzle assembly 34 extends downstream from the housing 30. The augmentor 32 includes a centerbody 38 centrally mounted within the gas flowpath by means of flameholders 40.

The centerbody 38 is generally symmetric around the axis 500. The centerbody has a forward tip 50 from which a continuously curving convex forebody or ogive 52 extends rearward until reaching a longitudinal or nearly longitudinal transition region 54 adjacent the flameholders 40. Aft of the transition region, the centerbody surface defines a pilot channel 56. A tailcone surface 58 extends aft from the pilot to an aft extremity of the centerbody.

Figure 2:
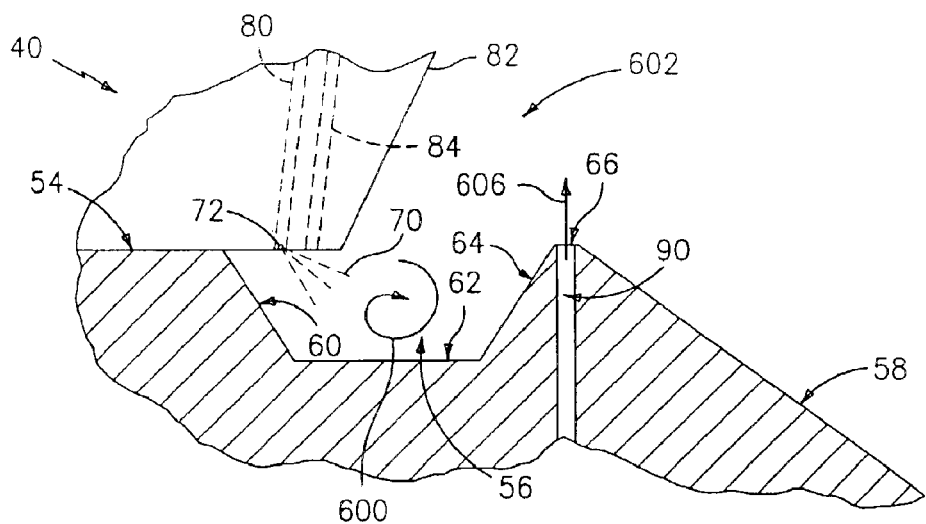
FIG. 2 is a partial semi-schematic longitudinal sectional view of a first augmentor for use in the powerplant of FIG. 1.

FIG. 2 shows further details of an exemplary pilot. An annular channel is formed by a frustoconical surface 60 extending rearward and radially inward from a junction with the surface 54. The surface 60 forms the fore (upstream) wall of an annular channel, with the junction forming the fore rim. A longitudinal surface 62 extends aft from a junction with the inboard extremity of the surface 60 and forms a base of the channel. A frustoconical aft wall surface 64 extends rearward and radially outward from a junction with the surface 62 and forms an aft wall of the channel. A longitudinal rim surface 66 extends aft from a junction with the surface 64 that defines a channel aft rim. The surface 66 provides a transition to the tailcone surface 58. A jet 70 of fuel is delivered to the pilot via nozzle 72 in an appropriate conduit. An exemplary conduit is shown as a spraybar 80 mounted within a flameholder element body 82. The spraybar 80 has a plurality of lateral nozzles (not shown) delivering jets of fuel from the two sides of the body 82. The nozzle 72 is angled at the end of the spraybar. In operation, the pilot channel serves to divert the generally recirculating pilot flow 600 from a principal (main) flow 602. The jet 70 of fuel is introduced to the flow 600 and combustion is induced by electric spark from an associated igniter 84. Fuel is also delivered to the principal flow 602 via the spraybar lateral nozzles noted above. The combusted/combusting fuel/air mixture in the flow 600 propagates around the pilot channel 56 stabilize and propagate flame radially outward to the flameholder bodies 82. Optionally, the centerbody may be provided with several conduits 90 for ejecting air jets 606. In an exemplary embodiment, there are a ring of such conduits having outlets at the surface 66. The conduits 90 may be supplied from one or more conduits (not shown) extending through or along the flameholder to the centerbody ahead of the pilot. The air jets serve to enhance recirculation of the flow 600.

Figure 3:
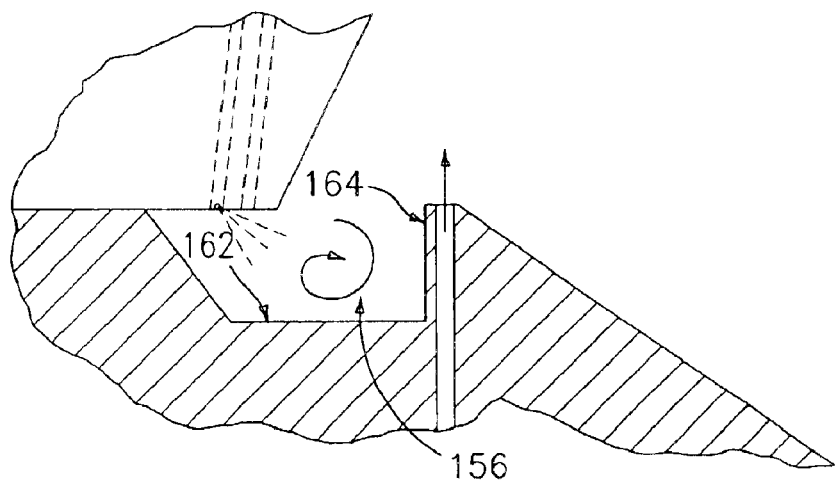
FIG. 3 is a partial semi-schematic longitudinal sectional view of a second augmentor for use in the powerplant of FIG. 1.

FIG. 3 shows an alternate pilot 156 which is otherwise similar to the pilot 56 but for the channel aft wall 164 being essentially radial and the surface 162 being accordingly, extended relative to the surface 62 to meet the surface 164. The radial orientation of the surface 164 may further enhance recirculation.

Figure 4:
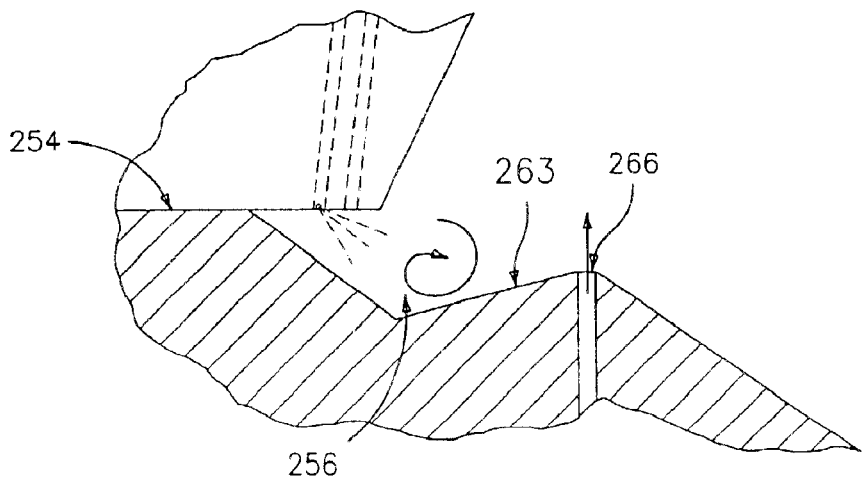
FIG. 4 is a partial semi-schematic longitudinal sectional view of a third augmentor for use in the powerplant of FIG. 1.

FIG. 4 shows a pilot 256 wherein the surface step 62 and 64 of the pilot 56 are replaced by a single frustoconical surface 263. Additionally, a rim surface 266 is shown relatively radially inboard of the surface 66 so as to be radially inboard of the body transition surface 254. Such a configuration may be utilized to reduce weight and/or improve durability.

One or more embodiments of the present invention have been described. Nevertheless, it will be understood that various modifications may be made without departing from the spirit and scope of the invention. For example, the inventive pilot may be applied in a retrofit or redesign of an otherwise existing engine. In such cases, various properties of the pilot would be influenced by the structure of the existing engine. In any implementation, stability considerations may be balanced against other performance considerations. The particular balance desired may influence details of the possible implementations. Accordingly, other embodiments are within the scope of the following claims.

What is claimed is:

1. A turbine engine comprising:
   a centerbody within a gas flowpath from upstream to downstream and having a downstream tailcone and a pilot proximate an upstream end of the tailcone; and
   a flameholder positioned in the gas flowpath outboard of the centerbody, wherein the pilot has:
   a channel having a first surface diverging in a downstream direction; and
   means for directing a supplemental air flow for enhancing recirculation of a combusting fuel/air mixture upstream of the tailcone.

2. The engine of claim 1 wherein the first surface is frustoconical.

3. The engine of claim 1 wherein the channel has upstream and downstream rims and a base having a depth from a closer of said upstream and downstream rims between 25 mm and 75 mm.

4. The engine of claim 1 wherein the means comprises:
   a plurality of air conduits for delivering air jets radially outward from the centerbody proximate the downstream rim.

5. The engine of claim 1 further comprising:
   a plurality of fuel injectors at inboard ends of associated spray bars extending through elements of the flameholder.

6. The engine of claim 5 further comprising:
   a plurality of igniters positioned within the elements of the flameholder to ignite fuel from associated ones of the fuel injectors.

7. The engine of claim 1 wherein the channel is annular.

8. The engine of claim 1 wherein the channel has a downstream rim radially inboard of an upstream rim.

9. The engine of claim 8 wherein the channel is annular.

10. The engine of claim 1 wherein the centerbody is a remote centerbody.

11. The engine of claim 10 wherein the channel is annular.

12. A turbine engine centerbody extending from upstream to downstream along a central axis and having, from upstream-to-downstream:
    a nose;
    a radially diverging fore surface;
    an apex region;
    a pilot having a radially converging upstream surface, a base surface and a radially diverging downstream surface;
    a plurality of air conduits for delivering air jets radially outward from the centerbody proximate the downstream surface of the pilot for enhancing flow recirculation within the pilot; and
    a radially converging tailcone.

13. The centerbody of claim 12 wherein the pilot upstream surface, base surface, and downstream surface define an annular channel.

14. The engine of claim 13 wherein the channel has a downstream rim radially inboard of an upstream rim.

15. The centerbody of claim 12 wherein the pilot base surface is longitudinal.

16. The centerbody of claim 15 wherein the pilot upstream surface, base surface, and downstream surface define an annular channel.

17. The engine of claim 16 wherein the channel has a downstream rim radially inboard of an upstream rim.

18. A turbine engine augmentor comprising:
    a flameholder positioned in a gas flowpath; and
    a centerbody extending generally fore-to-aft within the gas flowpath and having:
    an upstream nose;
    a downstream tailcone; and
    means, including supplemental air conduits in the centerbody, for redirecting a pilot flow from the gas flowpath so as to create enhanced mixing effective to maintain flame propagation radially outward along the flameholder.

19. The augmentor of claim 18 wherein the means comprises a recess in the centerbody and the augmentor further comprises:
    a fuel injector positioned within the flameholder to direct fuel to the recess; and an igniter positioned within the flameholder for igniting said fuel.

20. A turbine engine centerbody extending from upstream to downstream along a central axis and having, from upstream-to-downstream:
    a nose;
    a radially diverging fore surface;
    an apex region;
    a pilot formed as a channel between upstream and downstream rims;
    a plurality of air conduits for delivering air jets radially outward from the centerbody proximate the downstream rim;
    a fuel conduit delivering a fuel jet to the pilot upstream of the air conduits; and
    a radially converging tailcone.

* * * * *